G. T. TRUNDLE.
CLUTCH.
APPLICATION FILED JULY 12, 1911.

1,040,466.

Patented Oct. 8, 1912.

Witnesses.
Hugh B. McGill.
Brennan B. West.

Inventor
George T. Trundle,
By Albert H. Bates,
Attorney

UNITED STATES PATENT OFFICE.

GEORGE T. TRUNDLE, OF CLEVELAND, OHIO, ASSIGNOR TO THE AMERICAN MULTI-GRAPH COMPANY, OF CLEVELAND, OHIO, A CORPORATION OF OHIO.

CLUTCH.

1,040,466.   Specification of Letters Patent.   Patented Oct. 8, 1912.

Application filed July 12, 1911. Serial No. 638,183.

*To all whom it may concern:*

Be it known that I, GEORGE T. TRUNDLE, a citizen of the United States, residing at Cleveland, in the county of Cuyahoga and State of Ohio, have invented a certain new and useful Improvement in Clutches, of which the following is a full, clear, and exact description, reference being had to the accompanying drawings.

The object of this invention is to provide a simple and efficient friction clutch adapted to enable a driven member to be instantly clutched to a coaxial driving member and instantly released therefrom after it has traveled therewith a predetermined amount.

My clutch is well adapted for use in various machines wherein a normally idle driven part must be accurately started and stopped, whether it makes a single rotation or a plurality of rotations or a part of a rotation on each movement.

The invention, comprising the means by which I accomplish this accurate driving, is hereinafter more fully described and its essential characteristics are set out in the claims.

Figure 1:
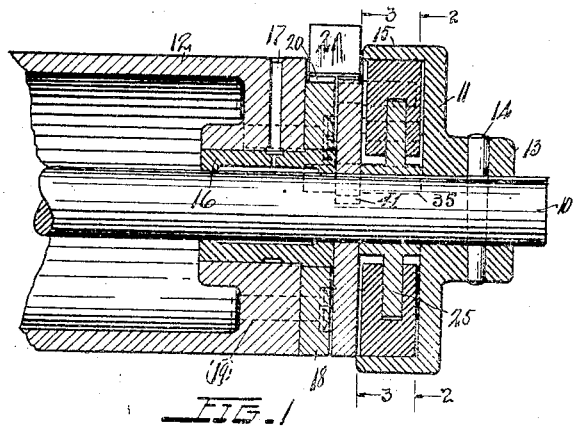
Figure 2:
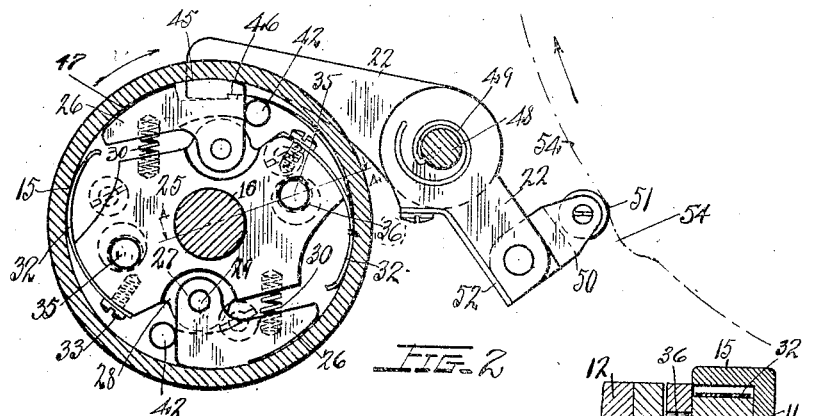
Figures 3, 4:
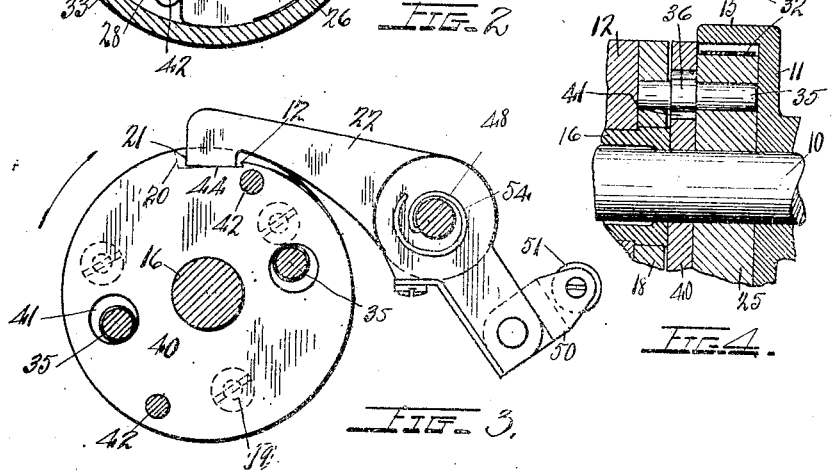

In the drawings, Figure 1 is a longitudinal central section through my clutch mounted on a suitable driving shaft, combined with a roller on the same shaft constituting a driven member; Figs. 2 and 3 are transverse sections on the lines 2—2 and 3—3 of Fig. 1, each looking toward the left; Fig. 4 is a fragmentary radial section on this line 4—4 of Fig. 2.

In the drawings, 10 represents the driving shaft, 11 is the driving member of the clutch, and 12 a driven member. The member 11 is shown as a cup having a hub 13 by which it is pinned by a pin 14 to the shaft. The wall 15 of the cup is cylindrical internally and is shown as being also cylindrical externally, whereby its exterior may constitute a roller having rolling coaction with any mechanism (not shown) or, if desired, the exterior may take other form than that shown. The member 11, in the embodiment shown, may constitute the rotator for the shaft instead of being rotated by the shaft, and in other embodiments the member 12 could be the driving member and the member 11 the driven member.

The member 12 is shown as a roller having an internal bushing 16 which loosely surrounds the shaft. This bushing is shown as formed with an annular oil space adjacent to the shaft connected by a radial opening 17 with the exterior of the roller 12. Surrounding the projecting end of the bushing 16 and secured to the end of the roller is a disk 18. This disk is shown as held to the roller by suitable screws 19. The disk is provided with a notch 20 in its periphery adapted to be occupied by the nose 21 of a controlling arm 22. Accordingly, this arm may hold the roller 12 positively against movement.

Loosely mounted on the shaft within the cup portion of the member 11 is a spider 25 connected by pins 35 with the disk 18. Accordingly, the spider, pins, disk 18, bushing 16 and roller 12 all rotate, or remain stationary, as a unit, and thus together constitute the real driven member. Accordingly, when the driven roller 12 and the disk 18 are held normally stationary by the arm 22, the clutch mechanism carried by the spider within the wall 15 is also held stationary, and the driving member revolves independently of the internal clutch mechanism. Pivoted to this spider 25 are shoes 26 adapted to bear against the inner periphery of the wall 15. Two of these shoes are shown. They are pivoted by means of pins 29 passing through ears 27 of the shoes and reduced portions 28 of the spider, onto opposite sides of which the ears extend. The outer surface of the shoe is formed in arcs about three centers, thus presenting a heel portion 46 concentric of the pivot 29, a gripping portion 45 eccentric of such pivot, and a portion 47 concentric of the shaft 16 and always out of contact with the wall 15. Compression springs 30 mounted in recesses on the inner face of the shoes and the outer edge of the spider tend to force the shoes against the inner periphery of the wall 15. The spider also is shown as having a pair of leaf springs 32 secured to it by cap screws 33. These springs also bear against the inner periphery of the wall 15. The operation of this internal clutching mechanism will be hereinafter described.

Between the spider 25 and the driven disk 18 is a disk 40, loose on the shaft and having holes 41 in it through which the pins 35 loosely extend, the holes being considerably larger than the pins. The pins are shown as having a slightly enlarged central portion 36 preventing their working axially into contact with the driving member. The loose disk 40 carries a pair of pins 42 rigidly mounted in it and projecting into the cup 11 adjacent to the heels of the shoes 26. The disk 40 has a notch 44 in its periphery adapted to stand alongside of the notch 20 and to be occupied by the nose 21 of the controlling arm 22.

It will be seen from the construction described that all the parts of the mechanism shown are normally idle, with the exception of the shaft and driving member 11, the direction of rotation of these parts being indicated by the arrow in Fig. 2. This figure represents the parts in their clutched condition just before being unlocked. When unlocked, the toe portion 47 of the shoes are swung inward so that the heels 46 lie close to the wall of the cup. The line connecting the engaged portion of the shoe with the pivot 29 is at an angle to the line connecting such pivot with the axis of the shaft 16, so that the spider and shoe make a toggle joint tending to straighten by reason of the drag on the shoes of the normally rotating wall 15. Accordingly, the rotation of the driving member keeps the heels of the shoes against the now stationary pins 42 (held by the nose 21 in the notch 44) and thus holds those shoes swung inwardly against the force of the springs 30 and free enough from the wall 15 to allow independent movement, but close enough thereto to be ready to instantly engage the wall. This action on the shoe is rendered more certain by the grip of the leaf springs 32 against the wall 15, which thus tends to rotate the spider and insure proper compression of the springs 30. Now, when the arm 22 is raised, not only is the driven member released but also the loose disk 40, and thereupon the pins 42 cease to be stationary abutments, and the springs 30, together with the tending of the rotation to straighten the line of the toggle, force the shoes outwardly, shoving on the pins 42 and turning the disk 40 ahead slightly. In this movement, the shoes grip the wall 15 and the spider and shoes and the rest of the driven member rotate with the driving member. The space in the holes 41 around the pins 35 allow the independent movement of the disk 40, as explained. After the rotation of the driven member has begun, the nose 21 of the arm 22 may be allowed to rest on the periphery of the disks 18 and 40 so that when the rotation is completed the nose will travel into the notches 44 and 20 and stop the rotation of the driven member. In such operation the far end of the notch 44 engages the front of the nose before the far end of the notch 20 engages, and during this short interval the relative retarding of the disk 40 releases the clutch by reason of the pins 42 acting on the shoes so that all the driven parts come to rest with the ends of the notches 44 and 20 both engaging the face of the nose 21. This enables the accurate stopping of the clutch desired.

The engagement of the clutch, as above explained, is instantaneous as soon as the arm 22 is raised. I have shown but one notch 20 and 44 on their respective disks, but this is to be taken as illustrative of any number, according to the amount of rotation desired with each engagement of the clutch. In the embodiment shown, the clutch makes a single rotation for each engagement if the member 22 is allowed to return during such rotation. Obviously, however, this member may be held out of action for as long a period as desired, whereby the driven member will receive continuous rotations.

The arm 22 may be operated by any suitable means. As shown, it is a lever loose on a shaft 48. Pivoted to this lever is an arm 50 on which is a roller 51. The arm 50 is normally held in the position shown by a leaf spring 52 secured to the lever. With such construction, a suitable cam indicated by 54 and acting on the roller 51 may raise the lever 22 to free the clutch, the lever returning automatically as soon as released. Any suitable mechanism may cause such return, as, for example, that indicated by the spring 49. The pivoting of the arm 50 enables the cam on the backward movement to pass the roller 51, the arm 50 swinging against the action of the spring 52 (lighter than the spring 49) to allow such movement. The slight rear shoulder of the notches 44 and 20 prevents the idle driven member at any time being accidentally turned in the wrong direction.

Having thus described my invention, what I claim is:—

1. In a clutch, the combination of a driving member, a driven member, means for establishing a frictional drag between them, a clutch shoe connected with one of said members, means for causing the shoe to engage the other member, a rotatable member capable of independent rotative movement and having means adapted to act on the shoe to hold it out of engagement, and a controlling device for said rotatable member.

2. In a clutch, the combination of a driving member, a driven member, a spring maintaining constant friction between them, a clutch shoe connected with one of said members, a spring tending to cause it to engage with the other member, a rotatable member capable of independent rotative movement and having means normally acting on the shoe to hold it out of engagement, and means normally acting on the independent member to hold it against rotation.

3. In a friction clutch, the combination of a driving member, a driven member, a pivoted shoe connected with one of said members and adapted to frictionally engage a smooth surface of the other member, a spring acting on the shoe and tending to cause such engagement, a rotatable device having means acting on the heel of the shoe to swing it against the action of the spring to free the engaged member, and means for controlling the said rotatable device.

4. In a clutch, the combination of coaxial driving and driven members, a spring secured to one of said members and constantly bearing against the other to establish a frictional drag between them, a pivoted shoe connected with one of said members and adapted to engage the other member, a spring acting on the shoe and tending to cause such engagement, a coaxially rotatable disk having means acting on the heel of the shoe to swing it against the action of the spring to free the engaged member, and an arm adapted to engage a shoulder on the disk for controlling its rotation.

5. In a friction clutch, the combination of a rotatable member having a circular recess with a smooth wall, a second rotatable member, a shoe pivotally mounted on said second member, a spring between the second member and shoe tending to force the shoe into frictional engagement with the wall of the recess, and a third rotatable member capable of some rotation independently of the two members mentioned, a projection carried by the independent member and bearing against the heel of the shoe, and means for controlling the independent member.

6. In a clutch, the combination of a rotatable member having a circular recess, a coaxial rotatable member, means for establishing a frictional drag between the two, shoes pivotally mounted on the last mentioned member and adapted to engage with the wall of the recess, a coaxial member mounted between the two members mentioned and capable of some rotation independently thereof, pins carried by the independent member and bearing against the heels of the shoes, and means for controlling the independent member.

7. In a clutch, the combination, with a shaft, of a member thereon having a circular recess, a spider surrounding the shaft within the recess, a frictional drag between the spider and member, a clutch shoe pivoted to the spider, a spring acting against the spider and shoe tending to cause the shoe to engage the wall of the recess, an independent member, a shoulder carried by it adapted to hold the shoe out of driving contact with the recess wall, and means for controlling the independent member.

8. In a friction clutch, the combination, with a shaft, of a member rigid thereon having a circular recess with a smooth wall, a spider loosely surrounding the shaft within the recess, clutch shoes pivoted to the spider, springs acting against the spider and shoes tending to cause the shoes to frictionally engage the wall of the recess, a rotatable member connected with the spider, an independent member, pins carried by it adapted to engage the shoes and hold them out of driving contact with the recess wall, and means for controlling the independent member.

9. In a clutch, the combination of a rotatable driving member, a rotatable driven member, a clutch shoe pivotally connected with one of said members, means for causing the shoe to engage the other by swinging on such pivot, the shoe having an engageable surface eccentric to the pivot, an independently rotatable member having means adapted to engage the shoe and hold it swung on its pivot to be out of action, and means for controlling the last mentioned member.

10. In a clutch, the combination of a rotatable driving member, a coaxial rotatable driven member, a shoe pivoted to one of said members and having a surface adapted to engage the other, the line connecting the engaged surface and the pivot of the shoe being at an angle with the line connecting the pivot of the shoe and the axis of rotation, whereby the tendency of rotation is to cause the shoe to engage the other member by a toggling action, and means adapted to engage the shoe and prevent such toggling action.

11. In a clutch, the combination of a rotatable member having a circular recess, a spider within the recess rotatable about the same axis, a shoe pivoted to the spider and adapted to engage the wall of the recess, the shoe having an engageable surface eccentric of its pivot and adjacent thereto having a surface concentric of such pivot, means for holding the shoe swung on its pivot with its concentric surface in loose engagement with the wall of the recess and with a line connecting the point of beginning of the eccentric surface with the pivot of the shoe at an angle to the line connecting the pivot of the shoe with the axis of rotation.

12. In a clutch, the combination of a rotatable driving member, a rotatable driven member, a clutch shoe connected with one of said members, a spring tending to cause such shoe to engage the other member, a controllable abutment for the shoe, means for establishing continuous friction between the member carrying the shoe and the other member, whereby the rotation of such other member tends to constrain the spring and hold the shoe against the abutment.

13. In a clutch, the combination of a rotatable member having a circular recess, a rotatable spider within the recess, a shoe pivoted to the spider, a spring between the spider and the shoe tending to force the shoe into engagement with the wall of the recess, an independent member adapted to hold the shoe out of engagement, and means independent of the shoe for establishing a frictional drag between the spider and the wall of the recess.

14. In a clutch, the combination of a shaft, a member thereon having a circular recess, a spider on the shaft, a shoe pivoted to the spider, a spring between the edge of the spider and the shoe tending to force the shoe into engagement with the wall of the recess, an independent member adapted to hold the shoe out of engagement, and a spring carried by the spider and constantly acting on the wall of the recess.

15. In a clutch, the combination, with a shaft, of a member thereon having a circular recess around the shaft, a spider on the shaft within the recess, shoes pivoted on the spider and adapted to bear against the wall of the recess, springs carried by the spider and tending to force the shoes into such position, springs carried by the spider and bearing against the inner wall of the recess, an independent member rotatably mounted on the shaft and having pins adapted to bear against the heels of the shoes, and means for holding and releasing the independent member.

16. The combination of a shaft, a cup thereon, a device surrounding the shaft within the cup, a shoe pivoted to said device, a spring tending to cause the shoe to engage the wall of the cup, a frictional connection between the device and the wall of the cup, an independent member having a shoulder adapted to engage the shoe, and a rotatable member connected with said device.

17. In a clutch, the combination of a shaft, a driving member thereon having a recess, a driven member thereon, an independent disk between the two, a spider on the shaft within the recess connected with the driven member through openings in the independent disk, a shoe pivoted to the spider, means for causing the shoe to bear against the wall of the recess, a pin carried by the independent disk and adapted to form an abutment for the shoe, and a controlling device to engage the independent disk.

18. The combination of a shaft, a cup thereon, a member to be driven on the shaft, a controlling disk on the shaft between the cup and driven member, a driven device surrounding the shaft within the cup, a connection between said device and the member to be driven, a shoe pivoted to said device and adapted to engage the wall of the cup, a spring tending to cause such engagement, means for establishing friction between said device and the wall of the cup, and a pin carried by the independent disk adapted to engage the shoe.

19. The combination of a shaft, a driven member thereon, a driving member on the shaft having a circular recess, a driven spider on the shaft within the recess, a connection between the spider and driven member, a shoe pivoted to the spider and adapted to engage the wall of the recess, a spring tending to cause such engagement, a rubbing device between the spider and the wall of the recess, an independent disk between the driving member and the driven member, a pin carried thereby adapted to engage the shoe, a shoulder on said independent disk, and a controlling member adapted to engage said shoulder to hold the disk or free the shoulder to allow the disk to move to set the clutch.

20. The combination of a shaft, a rotatable cup and a rotatable roller thereon, a disk between the cup and roller capable of some rotation independent of either, a spider on the shaft within the cup, a pair of shoes pivoted to said spider and adapted to engage the wall of the cup, a pair of springs set into sockets in the edges of the spider and shoes and tending to expand to seat the shoes, a pair of pins carried by the independent disk and adapted to bear against the heels of the shoes, a pin connecting the spider with the driven member and passing loosely through an enlarged opening in the intermediate disk, a leaf spring secured to the edge of the spider and bearing against the inner periphery of the cup, and means for controlling the rotation of the independent disk.

In testimony whereof, I hereunto affix my signature in the presence of two witnesses.

GEORGE T. TRUNDLE.

Witnesses:
R. E. WARWICK,
GEO. S. LIVINGSTON.

Copies of this patent may be obtained for five cents each, by addressing the "Commissioner of Patents, Washington, D. C."